No. 745,995. PATENTED DEC. 8, 1903.
A. E. BERGEY.
CALCULATING MACHINE.
APPLICATION FILED MAR. 25, 1903.
NO MODEL. 2 SHEETS—SHEET 1.

WITNESSES: INVENTOR
Geo. B. Lewis Aaron E. Bergey
George M. Newmyer

No. 745,995. PATENTED DEC. 8, 1903.
A. E. BERGEY.
CALCULATING MACHINE.
APPLICATION FILED MAR. 25, 1903.
NO MODEL. 2 SHEETS—SHEET 2.

Witnesses.
Geo. B. Lewis
George M. Newmyer

Inventor.
Aaron E. Bergey

No. 745,995. Patented December 8, 1903.

UNITED STATES PATENT OFFICE.

AARON E. BERGEY, OF BELLEVUE, PENNSYLVANIA.

CALCULATING-MACHINE.

SPECIFICATION forming part of Letters Patent No. 745,995, dated December 8, 1903.

Application filed March 25, 1903. Serial No. 149,521. (No model.)

*To all whom it may concern:*

Be it known that I, AARON E. BERGEY, a citizen of the United States, residing at Bellevue, in the county of Allegheny and State of Pennsylvania, have invented a new and useful Calculating-Machine, of which the following is a specification.

My invention relates to that class of calculating-machines in which a graduated scale, and more especially a logarithmic scale, is used.

My object is to provide a calculating-machine more rapid and accurate than those now in use. I attain this object by means shown in the accompanying drawings, in which—

Figure 1:
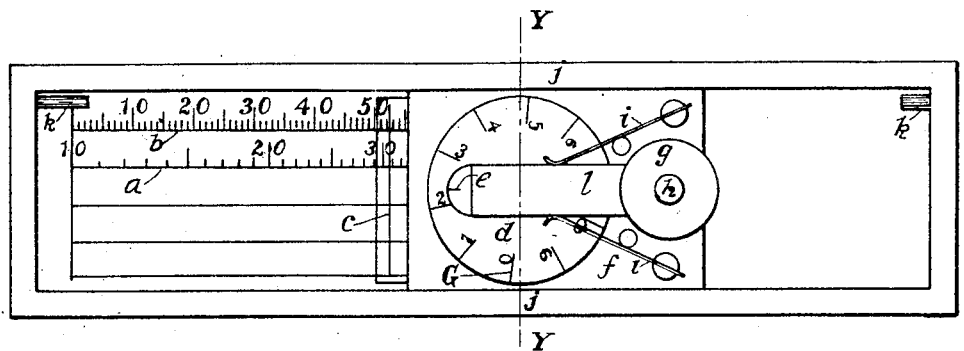
Figure 2:
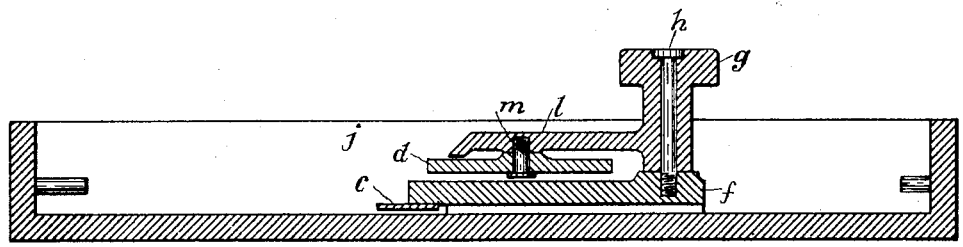
Figure 3:
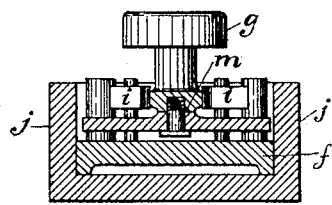
Figure 4:
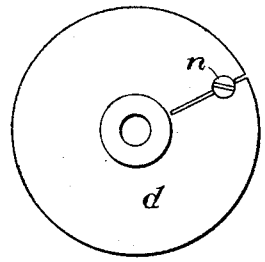
Figure 5:
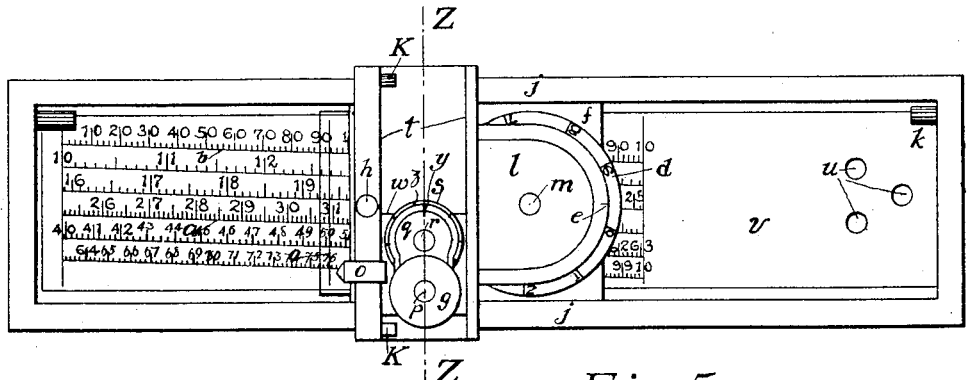
Figure 6:
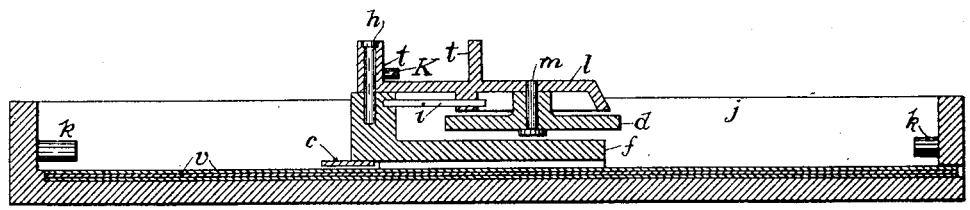
Figure 7:
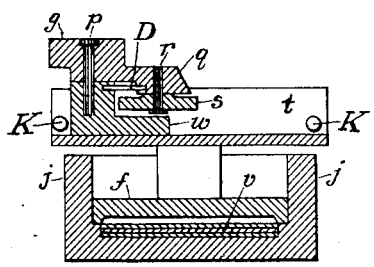
Figure 8:
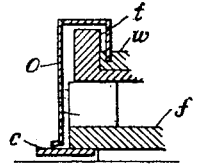

Figure 1 is a plan, Fig. 2 a longitudinal vertical section through the center, and Fig. 3 a cross-section on the line Y Y, of a calculating-machine in which the logarithmic scale is arranged all on one line. Fig. 4 shows an improved measuring-wheel that can be used in the registering mechanism. Fig. 5 is a plan, Fig. 6 a longitudinal vertical section through the center, Fig. 7 a cross-section on the line Z Z, and Fig. 8 a section through the index, of a calculating-machine in which the logarithmic scale is arranged on a succession of lines.

I shall first describe the calculating-machine shown in Figs. 1, 2, and 3.

A logarithmic scale $a$ is inscribed or mounted on a frame $j$. An index $c$ is adapted to be moved from point to point on the scale $a$. Connected with the index $c$ is a registering mechanism such that when the index $c$ is moved from point to point on the scale $a$ the registering mechanism can be put in or out of action, so as to register any desired part of the motion of $c$ on the scale. It will be seen that by this means the operation of multiplication or division by any numbers on the scale can be performed. For example, to perform the operation $30 \times 35$. Starting with the registering mechanism in an initial position, the index $c$ is moved normally—that is, with the registering mechanism out of action, so as not to register the motion of $c$—to "30" on the scale, then it is moved in action—that is, with the registering mechanism in action, so as to register the motion of $c$—to unity, (by unity here is meant either end of the scale, as "10" or "100,") then it is moved normally to "35" on the scale, then it is moved in action to unity, then it is moved in action until the registering mechanism resumes its initial position, when $c$ will be opposite the product of thirty and thirty-five. It is evident that $c$ might have been moved in action directly from "35" to the product. Take another example. To perform the operation $30 \times 35 \div 68$: Starting with the registering mechanism in an initial position, $c$ is moved normally to "30," then in action to unity, then normally to "35," then in action to unity, then in action to "68," then normally to unity, then in action until the registering mechanism resumes its initial position, when $c$ will be opposite the answer. A shorter procedure is thus: Starting with the registering mechanism in an initial position, $c$ is moved normally to "30," then in action to "68," then normally to "35," then in action until the registering mechanism resumes its initial position, when $c$ will be opposite the answer.

The registering mechanism can be made in different forms; but there are two forms which I consider superior to all others. One of these has an endless band or chain for measuring the motion of the index on the scale. I intend to make this the subject of a separate application for Letters Patent and shall not any further describe it here. The other form I shall now describe in so far as it relates to the calculating-machine shown in Figs. 1, 2, and 3. Connected with the index $c$ is a measuring-wheel $d$ and a registering-index G such that when $c$ is moved from one end of the logarithmic scale $a$ to the other end of the scale the registering-index G will pass through one cycle. I prefer to have only one registering-index G inscribed or mounted directly on the measuring-wheel $d$, so that one cycle of G will correspond to one revolution of $d$. It is evident that in this case the circumference of the wheel $d$ must be equal in length to the path which it follows as the index $c$ is moved from end to end of the scale $a$. The index $c$ is attached to a slide $f$, which can slide in the frame $j$ along the scale. The wheel $d$ can turn on a shaft $m$, which is attached to the swivel $l$. The swivel $l$ can rock on a shaft $h$, which is attached to the slide $f$. A mark $e$ on the swivel $l$ serves to determine when the index G on the wheel d comes into its initial position. Springs i, operating against the swivel l, serve to keep the wheel d normally out of action. By means of a knob g the swivel l can be turned, overcoming the action of the spring i and forcing the wheel d against the sides of the frame j, so that when the slide f and the index c are moved along the scale a the wheel d and its index G will revolve, causing the latter to register the motion of c on the scale a. I provide springs i, such that the wheel d can be forced against either side of the frame j, thus enabling the registering action of G to be reversed. This arrangement is valuable in case a long succession of either multiplications or divisions is required. For example, to perform the operation 60×33×84×75×64: Starting with G in initial position—that is, opposite the mark e—c is moved normally—that is, d not touching j—to "60," then it is moved in direct action—that is, d touching one side of j—to unity, then in reverse action—that is, d touching the other side of j—to "33," then normally to "84," then in direct action to unity, then in reverse action to "75," then normally to "64," then in direct action until G comes opposite e, when c will be opposite the product.

I provide stops k, attached to the frame j, to stop the motion of the slide f and index c when the latter arrives at unity.

In Fig. 4 is shown an improved form of measuring-wheel d. A slit is cut in one side of the wheel nearly to the center and a tapered set-screw n inserted. By turning n the circumference of d may be slightly altered, thus admitting of accurate adjustment and compensation for wear.

I shall now describe the calculating-machine shown in Figs. 5, 6, 7, and 8. In this calculating-machine the logarithmic scale a is arranged on a succession of lines. Where there are only two or three lines, the same index and registering mechanism hereinbefore described can be used, the operator determining mentally which of the lines the answer is on; but where the scale a is arranged on quite a number of lines it is advisable to have mechanical means wherewith to determine on which of the lines the answer is to be found. I have shown on the drawings what I consider to be the most desirable form of this mechanism. The index c, the wheel d, the slide f, and the swivel l are similar to the corresponding parts shown in Figs. 1, 2, and 3, with the exception that only one spring i is placed underneath the swivel l (this spring serving, however, the purpose of holding d normally out of action in a manner exactly similar to that already described) and that instead of the knob g being attached to the swivel l a guideway t is provided, along which can be moved the slide w. This slide w carries an index o and a measuring and registering wheel s. This wheel s has an index-mark on it similar to the wheel d and can turn on a shaft r, attached to the swivel q. The swivel q has a mark y similar to that on the swivel l and which serves to show when the index-mark on the wheel s comes to its initial position. The swivel q can rock on a shaft b, attached to the slide w, and the swivel l can rock on a shaft h, attached to the slide f. A spring D operates on the swivel q, so as normally to hold the wheel s out of contact with the sides of the guideway t. By means of a knob g the swivel q can be turned so as to bring the wheel s in contact with either side of the guideway t, thus causing s to revolve when the slide w and index o are moved along the guideway t. The wheel s is made of such a diameter as to make one revolution or an even part of a revolution when moving in action completely across the scale. It will be seen that when the knob g is turned not only will the wheel s be brought into contact with the sides of the guideway t, but the wheel d will also be brought into contact with the sides of the frame j. I have shown then an index o, that can be moved from point to point on the scale a, connected with a registering mechanism, such that it can be made to register any desired part of the motion of the index on the scale both along the lines and across the lines of the scale.

The motion of the index across the lines of the scale as well as along the lines of the scale is toward the end of the scale, the motion crosswise from one line to the next being equivalent to the motion lengthwise from end to end of the lines. Hence it is desirable to have the cross-registering mechanism so constructed that it can be made to register the crosswise equivalent of the motion of the index along the lines of the scale. I have shown in the drawings what I consider the best means to accomplish this end. The guide for the slide f is at an angle to the lines of the scale such that a fixed point on the slide crossing over the beginning of one of the lines of the scale will depart uniformly from the line until it crosses the end of the next previous line. Therefore when the index o is moved along one of the lines of the scale it will have a crosswise motion, (proportional to the motion along the line,) which will be registered by the cross-registering mechanism. It will readily be seen that this machine can be used in a manner similar to that already described. For example, to perform the operation $$30 \times 86 \times 75 \div 44 \times 87 \div 58:$$

Starting with the wheels d and s both in initial position, the knob g is grasped and is moved normally until the indices o and c are both opposite "30," then twisting g so as to put the wheels s and d into direct action the indices c and o are moved to unity, then twisting g so as to put the wheels s and d into reverse action the indices o and c are moved to "86," then normally to "75," then in direct action to "44," then normally to "87," then in direct action to "58," then normally to unity, then in direct action until the wheels $s$ and $d$ both resume their initial position, when $c$ and $o$ will be opposite the answer. The stops $k$ serve to stop the index $c$ at unity and the stops K serve to stop the index $o$ at unity.

The slides $w$ and $f$ can evidently be moved either simultaneously or successively. This is a matter that depends upon the will or convenience of the operator. This does not, however, affect the method of computation. The index can be moved from point to point on the scale along any path within the limits imposed by the stops $k$ and K.

While any suitable device—such as, for example, the edge of the slide $f$—may be used for the index $c$, yet I prefer to make the index $c$ of a light mark or cut in a transparent substance, such as glass or celluloid, since this enables the operator to estimate more closely the position of the index when it comes opposite a point between the graduation-marks on the scale.

I prefer to have the wheels $s$ and $d$ graduated into a number of divisions, so as to indicate how far they have moved from their initial position. This is a convenience to the operator, for at the end of any operation when the operator wishes to find the answer he will have a fairly-good intimation where the index will come to rest when the measuring-wheels arrive at initial position, and thus he will not be so liable to move the index too far, as would be the case were the measuring-wheels not graduated.

A number of scales may be inscribed on thin sheets $v$, attached to the frame $j$, so that either one can be removed, exposing another scale to view.

I provide a scale of logarithms, as $b$, whereby the logarithm of any number on the scale $a$ can be readily determined with the aid of the index $c$. This scale of logarithms is arranged so as to represent the mantissæ of the logarithms of the numbers on the scale $a$. When the scale $a$ is arranged on one line, as shown in Fig. 1, these mantissæ evidently begin with ".000" and end with "1.000." When the scale $a$ is arranged on a succession of lines, the scale $b$ will still represent the mantissæ of the logarithms of the numbers on the scale $a$, but will represent these mantissæ in sections. Thus if the scale $a$ is arranged on ten lines the scale $b$ will represent the mantissæ, omitting the first figure after the decimal-point, this figure being supplied mentally by the operator. For the first line of the scale $a$ this figure is "0," for the second line it is "1," for the third line it is "2," and so on. Should the scale $a$ be arranged on twenty lines, these may be divided into ten sections of two lines each and the scale $b$ be arranged on two lines. Arrangements for other numbers of lines on the scales will readily suggest themselves to those familiar with logarithmic calculators. The scale $a$ (shown in Fig. 5) is arranged on five lines. Consequently the mantissæ of the logarithms of the numbers on the first line of the scale $a$ begin with ".0000" and end with ".2000." The mantissæ of the logarithms of the numbers on the second line of the scale $a$ begin with ".2000" and end with ".40000," and so on. The first figures of these mantissæ are not given on the scale $b$ and are to be supplied mentally by the operator. Consequently the numbers on the scale $b$ read from ".0000" at the beginning of the scale to "1.0000" at the center of the scale and from ".0000" at the center of the scale to "1.0000" at the end of the scale. The first figure of the mantissa of the logarithm of any number on the first half of the first line of the scale $a$ is evidently "0," on the second half of the first line "1," on the first half of the second line "2," and so on.

By using the scale $b$ in conjunction with the scale $a$ the operation of evolution or involution can be readily performed—for example, to perform the operation $(44)^{1.68}$. This operation consists in multiplying the logarithm of 44 by 1.68 and determining the number of which this product is the logarithm. To find the logarithm of 44, the index $c$ is moved opposite "44" on the scale $a$, and opposite the index $c$ on the scale $b$ is read "435," which is the mantissa of the required logarithm, omitting the first figure. Since the number "44" is on the first half of the fourth line of the scale $a$, the first figure of the mantissa is "6." Therefore the mantissa of the required logarithm is ".6435." Since the characteristic of the logarithm is "1," the logarithm is "1.6435." The number "1.6435" is now multiplied (in a way previously described) by the number "1.68," the result being "2.7611." The number having "2.7611" for its logarithm will be found on the second half of the fourth line of the scale $a$, since the first figure of the mantissa is "7." The index $c$ is now moved opposite "611" on the second half of the scale $b$, and opposite the index on the fourth line of the scale $a$ will be found the result—viz., "577.1"—three figures preceding the decimal-point, since the characteristic of the logarithm is "2."

The scale $b$, in connection with the index and registering mechanism described, can be used to perform the operations of addition and subtraction. For example, to perform the operation $248+786-443$. Commencing with the registering mechanism in initial position, the index $c$ is moved normally to "248" on the scale $b$, then in action to "443" on the scale $b$, then normally to "786" on the scale $b$, then in action until the registering mechanism resumes its initial position, when the index will be found opposite the answer on the scale $b$.

By using the lines of the scale $a$ in connection with the scale $b$, the use of the calculating-machine in performing addition or subtraction can be extended. For example, suppose it be required to perform the operation $3248+2786-1443$. If the scale $b$ is not of sufficient length to enable the operator to reach such large numbers, it may be used for the units, tens, and hundreds only, and by using the index $o$ and cross-registering mechanism and the lines (of the scale $a$) under the scale $b$ the thousands can be added and subtracted also. Thus, to perform the operation given—viz., 3248+2786—1443—the registering mechanisms are placed in initial position, then the indices are moved normally until the index $c$ is opposite "248" on the scale $b$ and the index $o$ is opposite the second half of the second line of the lines of the scale $a$. They are then moved in action until the index $c$ comes opposite "443" on the scale $b$ and the index $o$ comes opposite the second half of the first line of the lines of the scale $a$. They are then moved normally until the index $c$ is opposite "786" on the scale $b$ and the index $o$ is opposite the first half of the second line of the lines of the scale $a$. They are then moved in action until the registering mechanisms resume their initial position, when the index $c$ will be found to be opposite the number "591" on the scale $b$ and the index $o$ will be opposite the first half of the third line of the lines of the scale $a$, and since this corresponds to the number "4" the answer will evidently be "4591."

It will be seen that real lines, such as are shown on the drawings along the bottom of the graduations of the scales $a$ and $b$, are not necessary to the use of the machine, the word "line" as used in this specification being used in the sense of a "geometrical" line or a real line or merely a row of marks. It is, however, found convenient to have a real line along the bottom of the graduations, as this brings out more clearly the distinction between the different lines of the scales. For an adding-machine it is evident that the lines only along the bottom of the graduations of the scale $a$ are needed in connection with the scale $b$.

What I claim as my invention, and desire to secure by Letters Patent, is—

1. In a calculating-machine, a logarithmic scale in combination with an index movable thereon, and a registering mechanism adapted to register the motion of the index along the scale, substantially as described.

2. In a calculating-machine, in combination, a logarithmic scale, an index movable thereon, a measuring-wheel and means to indicate the motion of the measuring-wheel, substantially as described.

3. In a calculating-machine, in combination, a logarithmic scale arranged on a succession of lines, an index movable along the lines of the scale, and a registering mechanism adapted to register the motion of the index along the lines of the scale, substantially as described.

4. In a calculating-machine, in combination, a logarithmic scale arranged on a succession of lines, an index movable along the lines and across the lines of the scale, and a registering mechanism adapted to register the motion of the index along the lines and across the lines of the scale, substantially as described.

5. In a calculating-machine, in combination, a graduated scale, an index movable thereon, a measuring-wheel and means to indicate the motion of the measuring-wheel, substantially as described.

6. In a calculating-machine, in combination, a logarithmic scale, an index movable thereon, a registering mechanism adapted to register the motion of the index along the scale, and means for putting the registering mechanism in or out of action, substantially as described.

7. In a calculating-machine, in combination, a logarithmic scale, an index movable thereon, a registering mechanism adapted to register the motion of the index along the scale, and a stop adapted to arrest the motion of the index on arriving at unity on the scale, substantially as described.

8. In a calculating-machine, in combination, a graduated scale, an index movable thereon, and a registering mechanism adapted to register, either directly or reversely, the motion of the index along the scale, substantially as described.

9. In a calculating-machine, in combination, a graduated scale arranged on a succession of lines, an index movable along the lines and across the lines of the scale, and a registering mechanism adapted to register the motion of the index along the lines and across the lines of the scale, substantially as described.

10. In a calculating-machine, in combination, a number of scales $v$ which are independently removable so as to expose any desired scale to view, an index movable thereon, and a registering mechanism adapted to register the motion of the index along the exposed scale, substantially as described.

11. In a calculating-machine, the combination of the index $c$, the slide $f$, the measuring-wheel $d$, and means adapted to indicate the motion of the measuring-wheel, substantially as described.

12. In a calculating-machine, in combination, the index $c$, the slide $f$, the measuring-wheel $d$ and means to indicate the motion of the measuring-wheel, the index $o$ adapted to travel in a direction crosswise to the direction of the motion of the index $c$, and means adapted to register the motion of the index $o$, substantially as described.

In testimony whereof I have signed my name to this specification in the presence of two subscribing witnesses.

AARON E. BERGEY.

Witnesses:
GEO. B. LEWIS,
GEORGE M. NEWMEYER.